US009363165B2

(12) United States Patent
Deshpande et al.

(10) Patent No.: US 9,363,165 B2
(45) Date of Patent: Jun. 7, 2016

(54) ENHANCED CALL CONTROL FOR DIRECTING A CONTENT PATH OVER MULTIPLE CONNECTIONS (71) Applicant: QUALCOMM Incorporated, San Diego, CA (US)

(72) Inventors: Manoj M Deshpande, San Diego, CA (US); Nikhil Jain, San Diego, CA (US); Jose R Menendez, Encinitas, CA (US); Ram Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 13/794,572

(22) Filed: Mar. 11, 2013

(65) Prior Publication Data
US 2014/0254478 A1 Sep. 11, 2014

(51) Int. Cl.
| | |
|---|---|
| H04L 12/801 | (2013.01) |
| H04L 12/707 | (2013.01) |
| H04W 48/18 | (2009.01) |
| H04L 29/06 | (2006.01) |
| H04L 29/08 | (2006.01) |
| H04W 36/18 | (2009.01) |
| H04W 76/02 | (2009.01) |
| H04W 88/06 | (2009.01) |

(Continued)

(52) U.S. Cl.
CPC .............. *H04L 45/22* (2013.01); *H04L 45/24* (2013.01); *H04L 67/12* (2013.01); *H04L 69/24* (2013.01); *H04W 48/18* (2013.01); *H04L 45/28* (2013.01); *H04L 45/302* (2013.01); *H04W 36/18* (2013.01); *H04W 36/30* (2013.01); *H04W 76/025* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,613,171 B2 | 11/2009 | Zehavi et al. | |
| 7,991,399 B2 | 8/2011 | Ganesan | |

(Continued)

FOREIGN PATENT DOCUMENTS

| | | |
|---|---|---|
| EP | 1562390 A1 | 8/2005 |
| EP | 1641303 A1 | 3/2006 |
| GB | 2394862 A | 5/2004 |

OTHER PUBLICATIONS

International Search Report and Written Opinion—PCT/US2014/022722—ISA/EPO—Jun. 6, 2014.

*Primary Examiner* — Kevin C Harper
(74) *Attorney, Agent, or Firm* — The Marbury Law Group, PLLC (57) ABSTRACT Aspects for enhancing call control for directing a content path over multiple connections may include a method which includes establishing a first connection to a destination to use as a content path, receiving information from the destination for establishing an alternative connection, establishing as the alternative connection a background connection to the destination based on the information received, evaluating whether the background connection is preferable to the first connection for use as the content path, and switching the content path to the background connection when the background connection is preferable. Another method may include establishing a first connection as a content path and a background connection simultaneously to a destination for exchanging call traffic representing the same content, evaluating whether the background connection is preferable to the first connection for use as the content path, and switching the content path to the background connection when the background connection is preferable.

29 Claims, 4 Drawing Sheets (51) Int. Cl.
*H04L 12/703* (2013.01)
*H04L 12/725* (2013.01)
*H04W 36/30* (2009.01)

(56) References Cited

U.S. PATENT DOCUMENTS

| | | |
|---|---|---|
| 8,023,497 B2 | 9/2011 | Jayaram et al. |
| 8,037,188 B2 | 10/2011 | Li et al. |
| 2002/0059432 A1* | 5/2002 | Masuda et al. ............... 709/227 |
| 2002/0087674 A1 | 7/2002 | Guilford et al. |
| 2005/0090277 A1 | 4/2005 | Islam et al. |
| 2005/0097165 A1* | 5/2005 | Lahtinen et al. .............. 709/203 |
| 2006/0083199 A1 | 4/2006 | Yang |
| 2007/0015535 A1 | 1/2007 | LaBauve et al. |
| 2007/0015536 A1* | 1/2007 | LaBauve et al. ........... 455/552.1 |
| 2007/0147399 A1* | 6/2007 | Deng et al. ..................... 370/401 |
| 2008/0037473 A1* | 2/2008 | Brown et al. .................. 370/332 |
| 2008/0123661 A1* | 5/2008 | Steets et al. ............... 370/395.21 |
| 2011/0317667 A1 | 12/2011 | Li et al. |
| 2012/0317194 A1* | 12/2012 | Tian ............................... 709/204 |
| 2013/0007126 A1* | 1/2013 | Ziemann ...................... 709/204 |

* cited by examiner

ENHANCED CALL CONTROL FOR DIRECTING A CONTENT PATH OVER MULTIPLE CONNECTIONS

FIELD OF DISCLOSURE

Aspects of this disclosure generally relate to call control for network communications, and in particular, provide enhanced call control functionality which directs a content path over multiple connections to improve the exchange of call traffic.

BACKGROUND

Current wireless communications devices may provide a variety of interactive communication services over different air interfaces. Interactive communication, which may include two or more parties exchanging information in a conversational manner, may typically be carried over call traffic. Call traffic may broadly comprise control (signaling) packets, voice packets, video packets, and/or data packets (which may include image, text, audio, and/or animation data). The air interfaces may include different cellular protocols such as 2G, 3G, 4G, etc., Wireless Wide Area Networks such as WiMAX, and/or various Wireless Local Area Networks such as Wi-Fi, Bluetooth, etc. Over these air interfaces, call traffic may be transported utilizing different call modes such as Circuit Switched (CS) or Packet Switched (PS) (e.g., Voice Over Internet Protocol (VoIP)) call modes. While many mobile terminals today have support for multiple radios, current call control is typically limited in selecting at most one air interface and one call mode (e.g., CS or VoIP) for a given interactive communication.

Traditional CS calls are typically limited to providing voice service, whereas PS calls, such as VoIP, can enhance call experience by leveraging multimedia content. However, establishing a VoIP call can proceed only when both the parties are in VoIP compatible coverage. Additionally, the calling party and the called party can be using various VoIP service providers which may not be associated with the cellular network provider.

With current wireless devices, the user may be burdened with manually selecting the call mode (e.g., CS or VoIP) and further selecting one of various over the top VoIP service providers. Additionally, the user may be further tasked with manually maintaining multiple address books of their contact's destination information for each VoIP service.

SUMMARY

Various embodiments are directed to systems and methods for controlling a content path over multiple connections. For example, a mobile terminal (instead of the user) may control the selection of a content path over the multiple connections which may simultaneously carry call traffic.

In one embodiment a method for controlling a content path over multiple connections is provided. The method may include establishing a first connection to a destination to use as a content path, and receiving information from the destination for establishing an alternative connection. The method may further include establishing as the alternative connection a background connection to the destination based on the information received, evaluating whether the background connection is preferable to the first connection for use as the content path, and switching the content path to the background connection when the background connection is preferable.

In another embodiment, a mobile terminal which controls a content path over multiple connections is described. The mobile terminal may include at least one transceiver, a modem coupled to the at least one transceiver, and a memory coupled to the modem. The memory may store executable instructions and data which can cause the modem to establish a first connection to a destination to use as a content path, receive information from the destination for establishing an alternative connection, establish as the alternative connection a background connection to the destination based on the information received, evaluate whether the background connection is preferable to the first connection for use as the content path, and switch the content path to the background connection when the background connection is preferable.

Another embodiment may include a method for controlling a content path over multiple connections. The method may include establishing a first connection and a background connection simultaneously to a destination for simultaneously exchanging call traffic representing the same content, wherein the first connection is used as a content path, evaluating whether the background connection is preferable to the first connection for use as the content path, and switching the content path to the background connection when the background connection is preferable.

Another embodiment may include a mobile terminal which controls a content path over multiple connections. The mobile terminal may include at least one transceiver, a modem coupled to the at least one transceiver; and a memory coupled to the modem. The memory stores executable instructions and data which may cause the modem to establish a first connection and a background connection simultaneously to a destination for simultaneously exchanging call traffic representing the same content, wherein the first connection is used as a content path, evaluate whether the background connection is preferable to the first connection for use as the content path, and switch the content path to the background connection when the background connection is preferable.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Aspects of the disclosure are directed to enhanced call control where a mobile terminal (instead of the user) may select from multiple connections, which may simultaneously carry call traffic, to establish a content path for user communications. As used herein, a "connection" may refer to a set of links through one or more networks which may be used exchange call traffic between at least two devices. As used herein, these devices may be broadly defined as mobile terminals. The connection may further include one or more "terminal links" to provide interface(s) between the mobile terminal and the network(s). In some embodiments, the terminal links may be realized as various air interfaces compatible with the mobile terminals. In various aspects, the simultaneous connections may be evaluated to select a single best performing connection as a content path to improve communications between mobile terminals. As used herein, a "content path" may be defined as a connection being used to exchange call traffic which represents the content being consumed by users associated with the mobile terminals. In other words, the content path is the connection being used for communications between the users of the mobile terminals. In other aspects, multiple connections using different terminal links may be maintained to provide robust failover service in the event one or more terminal links has intermittent reliability.

Figure 1:
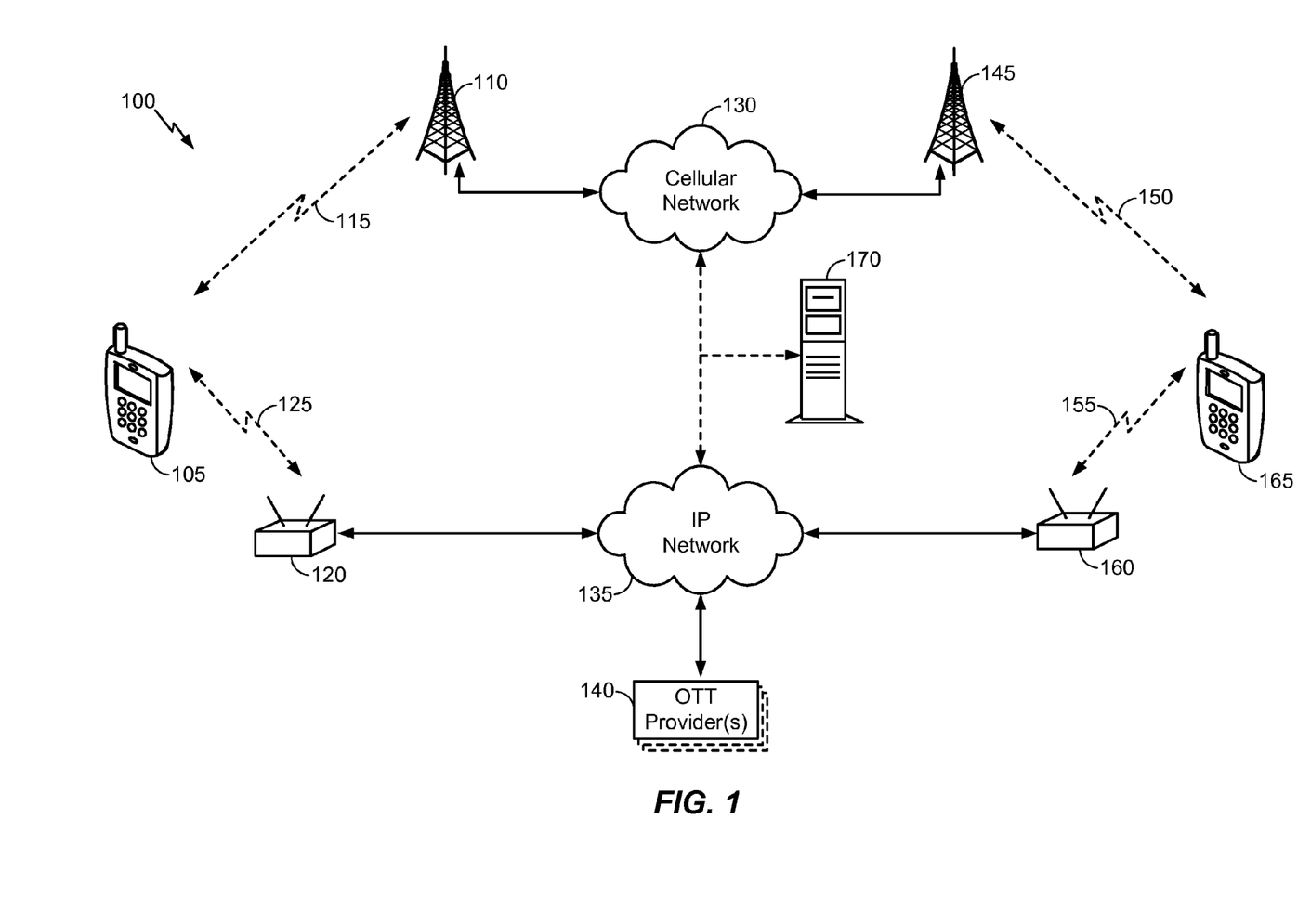
FIG. 1 is a diagram showing an example of a networking environment which includes mobile terminals having a plurality of connections for utilizing enhanced call control.

FIG. 1 is a diagram showing an example of a networking environment 100 having a plurality of connections which includes mobile terminals 105, 165 that may utilize enhanced call control. The networking environment 100 may include a plurality networks having their associated terminal links, which may be, for example, realized as different air interfaces as shown in FIG. 1. For example, the terminal links for mobile terminal 105 may include air interface 115 which interfaces with a cellular network 130 through base station 110. Mobile terminal 105 may further utilize another terminal link realized as an air interface 125, which may be part of a WiFi LAN which includes a wireless access point 120. The wireless access point 120 may interface to an IP network 135 and wireless access point 160. Mobile terminal 165 may utilize an air interface 150 as its terminal link, which interfaces to the cellular network 130 through base station 145. Mobile terminal 165 may further utilize another terminal link embodied as an air interface 155, which may be part of a WiFi LAN which includes a wireless access point 160, which may further exchange data with the IP network 135.

The IP network 135 may further provide connectivity to one or more "over the top" (OTT) service providers 140. Examples of OTT service providers may include VoIP service providers such as Skype, Google Talk, Apple FaceTime, etc. An optional server 170, configured to provide OTT service provider information to the mobile terminals 105, 165, may be connected to the cellular network 130 and/or the IP network 135 (where the dashed connector indicates that the inclusion of server 170 is optional).

While the exemplary networking environment 100 embodies the terminal links as air interfaces, it should be appreciated that one or more of these terminal links may instead be realized as a wired connection to its respective network.

Further referring to FIG. 1, in one exemplary scenario where enhanced call control may be employed, a user associated with mobile terminal 105 may first establish voice call with a destination mobile terminal 165 utilizing a connection over the cellular network 130 as the content path. The content path may be initiated by having the user place a call in a normal fashion by dialing the number associated with the destination mobile terminal 165 using the keypad of mobile terminal 105. The process of setting up the content path may start over air interface 115 between mobile terminal 105 and base station 110, where the air interface 115 may operate in the CS mode. The cellular network 130 may receive a request from the base station 110 to establish a CS mode call, and then determine that the base station 145 is the most appropriate base station to send a page to alert the destination mobile terminal 165 of an incoming call. Upon accepting the page, a first connection may be established as the content path over the air interface 150 between mobile terminal 105 and destination mobile terminal 165. Upon establishing the content path over the first connection, call traffic may be exchanged between the two mobile terminals over air interfaces 115 and 150 in the CS mode.

After the content path between the mobile terminals 105, 165 is established over the first connection, the mobile terminal 105 may query the destination mobile terminal 165 to determine if it has the capability to be contacted over an alternative connection. In response, the destination mobile terminal 165 may provide capability information back to the mobile terminal 105 regarding its capabilities for communicating over alternative connections, which may include information regarding various call modes, different terminal interfaces (e.g., alternative air interfaces), access information to various OTT services associated with the destination terminal 165, etc. This information may generally referred to herein as "capability tables." However, it should be noted that this information is in no way restricted to being organized and/or stored in a tabular form. In embodiment shown in FIG. 1, the alternative connection may use a different call mode, such as the PS call mode which may be appropriate for IP networks. However, in alternative embodiments, the first connection and the alternative connection may use the same call modes. The destination mobile terminal 165 may utilize air interface 155 provided by wireless access point 160, to connect with the IP network 135. These links, in conjunction with the air interface 125 provided by wireless access point 120 to mobile terminal 105, may be used to establish an alternative connection for call traffic between mobile terminals 105, 165. As noted above, the alternative connection may transfer call traffic using a PS call mode, such as VoIP.

The capability table provided by the destination terminal 165 may include the identification of various Over-The-Top (OTT) provider(s) 140 that have a predefined association with the user of destination mobile terminal 165 (e.g., a Skype account), which can be used to establish the alternative connection. The capability table may include the identification of the user and/or the IP address of the destination mobile terminal 165 used by the identified OTT provider(s), and any other information that may be used by the mobile terminal 105 to establish the alternative connection over the IP network 135 using air interface 125 provided by the wireless access point 120. In another aspect, the information regarding the OTT providers may be provided by a server 170, which can send the information in its entirety to the requesting mobile terminal 105 over the first connection through the cellular network 130, or in an alternative aspect, the server may supplement the information provided by the destination mobile terminal 165.

The alternative connection over the IP network 135 may exchange call traffic between the mobile terminals 105, 165 in a simultaneous manner with the first connection over cellular network 130. However, the alternative connection can operate as a "background connection," where the exchanged call traffic is not being used for the content path. Accordingly, for aspects presented herein, the mobile terminals 105, 165 may simultaneously exchange call traffic associated with the user's call over both the first connection and the background connection. The mobile terminal 105 may analyze both connections, and make a determination as to which connection is "preferable" for exchanging communications. This preference may be based upon which connection provides the highest call quality. The call quality may be determined using known metrics based on packet errors, latency, signal-to-noise ratios, etc. which measure the quality of the entire connection, inclusive of the air interfaces, the base stations, and the cellular network. Other criteria may be evaluated to determine whether a connection is preferable. In an embodiment, approaches for determining a preferable connection may be described, for example, in "ASSOCIATING A VoIP PROVIDER WITH A SET OF VOIP NETWORKS AS A PREFERRED OR DEFAULT VOIP PROVIDER" by Krishnan et al., U.S. patent application Ser. No. 13/794,547, filed on Mar. 11, 2013, assigned to the assignee hereof, and expressly incorporated by reference herein.

If the background connection is in some way preferable to the first connection, the mobile terminal 105 may switch the content path to the background connection. So in the example shown in FIG. 1, content will be exchanged between mobile terminals 105 and 165 using the VoIP call mode. The current first connection, using the CS call mode, is no longer in the content path, and effectively exchanges call traffic in the background. In some embodiments, once the content path is switched, the first connection may be terminated. In other embodiments, the first connection may be maintained as a redundant "fail-over" channel which may be switched over automatically if the content path on the background connection is interrupted or otherwise fails some quality criteria.

As will be explained in more detail below, the switching of content paths may be performed without any user intervention, and may also disconnect the new background connection upon completing a switch. The mobile terminal 105 can make choices among different connections based on associations stored in a capability table within the destination mobile terminal 165. The mobile terminal 105 can access the capability table over the cellular network and/or the IP network from the destination mobile terminal 165, where it may be remotely stored therein. In alternate embodiments, the capability table may reside in the server 170, which may be accessed by the mobile terminal 105 over the cellular network and/or the IP network. Alternatively, the capability table may be stored in the mobile terminal 105 (i.e., the origin of the connection) and be updated when required.

The capability tables may contain associations between identifiers used in different call modes among the different connections. For example, the capability tables may contain associations between standard phone numbers and VoIP IDs among different contacts in a user's address book. Additionally, these capability tables may further contain rules as to when different connections may be selected by the mobile terminal. Such determinations may be based, for example, on desired call quality, network congestion among the different air interfaces, bandwidth constraints, call rates among different providers, etc. Accordingly, instead of having a user select a connection, the call control functionality can be enhanced by having the mobile terminal 105 select from multiple connections simultaneously.

Clearly, the networking environment 100 shown in FIG. 1 has been simplified for ease of explanation, and may include more than two mobile terminals 105, 165 and two networks 130, 135, which may be of different types and greater complexity than what is exemplified. For example, instead of the two base stations 110, 145, the network may also include any number of Wide Area Network Wireless Access Points (WAN-WAPs), which may be used for wireless voice and/or data communication. The WAN-WAPs may be part of wireless wide area network (WWAN), which may include cellular base stations at known locations, and/or other wide area wireless systems, such as, for example, WiMAX (e.g., 802.16). The WWAN may include other known network components which are not shown in FIG. 1 for simplicity. Typically, each WAN-WAPs within the WWAN may operate from fixed positions, and provide network coverage over large metropolitan and/or regional areas.

Further referring to FIG. 1, the wireless access points 120, 160 may instead be any type or number of Local Area Network Wireless Access Points (LAN-WAPs) that can be used for wireless voice and/or data communication. The LAN-WAPs can be part of a Wireless Local Area Network (WLAN), which may operate in buildings and perform communications over smaller geographic regions than a WWAN. Such LAN-WAPs may be part of, for example, WiFi networks (802.11x), cellular piconets, femtocells, Bluetooth Networks, etc.

The enhanced call control techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) and so on. A CDMA network may implement one or more radio access technologies (RATs) such as cdma2000, Wideband-CDMA (W-CDMA), LTE, and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

In the embodiment shown in FIG. 1, for mobile terminal 105, the first connection may include the air interface 115 which can be established over a WWAN operating in CS mode. The background connection for mobile terminal 105 may utilize the air interface 125 which may include the use of a WLAN operating in PS mode. In other embodiments, both the first connection and the background connection may be established over the WWAN, where the first connection may operate in CS mode, and the background connection may operate in PS mode.

In another embodiment not shown in FIG. 1, the first connection and the background connection to a destination may be made in parallel to simultaneously exchange call traffic representing the same content i.e. both are technically acting as content paths but only one is being "paid attention to" by mobile terminals 105 and 165. In this embodiment, the first connection may be used as an official content path. The mobile terminal may evaluate whether the background connection is preferable to the first connection for use as the official content path. If the background connection is preferable, the official content path may be switched to the background connection's content path. The first connection may be subsequently terminated after the official content path is switched.

Figure 2:
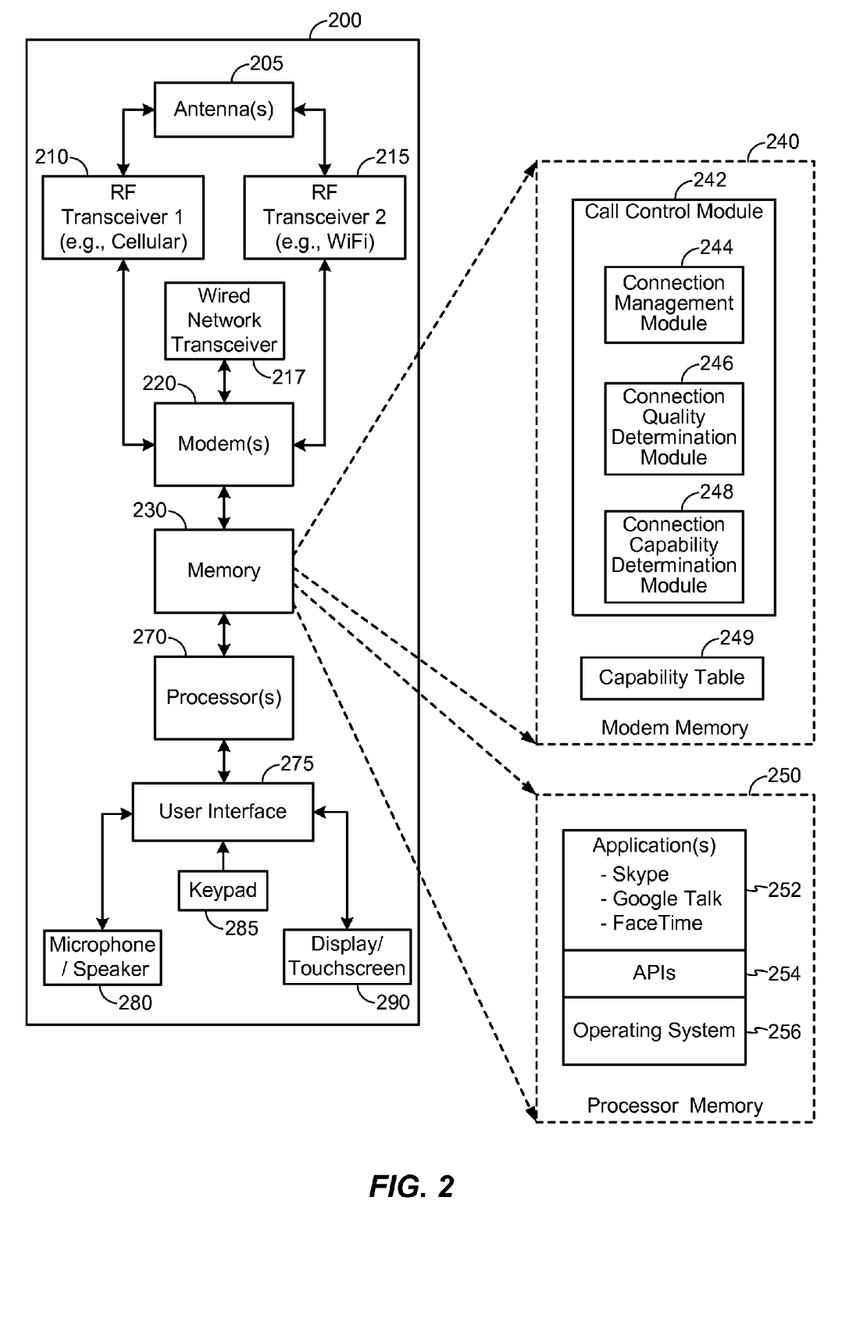
FIG. 2 is a block diagram illustrating various components of an exemplary mobile terminal.

FIG. 2 is a block diagram illustrating various components of an exemplary mobile terminal 200. The mobile terminal 200 may include one or more antenna(s) 205, and a plurality of RF transceivers, such as RF transceiver 1 210 and RF transceiver 2 215. The mobile terminal 200 may also include a wired network transceiver 217 for communicating over wired networks. The mobile terminal 200 may also include modem(s) 220, a memory 230, and processor(s) 270. Finally, the mobile terminal may further include a user interface 275 which permits the processor(s) 270 to interface to the microphone/speaker 280, the keypad 285 (which may be optional if touchscreen is present), and a display or touchscreen 290.

For the sake of simplicity, the various features and functions illustrated in the block diagram of FIG. 2 may be linked using a common connection which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

Referring to FIG. 2, RF transceiver 1 210 and RF transceiver 2 215 may be connected to one or more antenna(s) 205. RF transceiver 1 210 may comprise suitable devices, hardware, and/or software for communicating with and/or detecting signals to/from any type of WAN-WAP (e.g., base stations 110, 145), and/or directly with other suitable wireless devices within a network. In one aspect, RF transceiver 1 210 may comprise a CDMA and/or LTE communication system suitable for communicating with a CDMA and/or LTE network of wireless base stations; however in other aspects, RF transceiver 1 210 may also be compatible another type of cellular telephony network, such as, for example, TDMA or GSM. Additionally, any other type of wide area wireless networking technologies may be used, for example, WiMax (802.16), etc. The mobile terminal 200 may also include RF transceiver 2 215 that may be connected to one or more antennas 205. RF transceiver 2 215 comprises suitable devices, hardware, and/or software for communicating with and/or detecting signals to/from LAN-WAPs, and/or directly with other wireless devices within a local area network. In one aspect, RF transceiver 2 215 may comprise a WiFi (802.11x) communication system suitable for communicating with one or more wireless access points (e.g., wireless access points 120, 160); however in other aspects, RF transceiver 2 215 comprise another type of local area network, personal area network, etc. (e.g., Bluetooth). Additionally, any other type of wireless networking technologies may be used, for example, Ultra Wide Band, wireless USB etc. It should be understood that embodiments may include a mobile terminal 200 that can exploit signals from a plurality of LAN-WAPs simultaneously, a plurality of WAN-WAPs simultaneously, or any combination of the two simultaneously. The specific type of access point/base station being utilized by the mobile terminal 200 may depend upon the environment of operation. Moreover, the mobile terminal 200 may dynamically select between the various types of access points/base stations to perform the enhanced call control functions.

RF transceiver 1 210 and RF transceiver 2 215 may be connected to one or more modem(s) 220. The modem(s) 220 may perform functionality for extracting information from signals received from the RF transceivers 210, 215; or embed information in base-band signals for subsequent up-conversion and transmission by the RF transceivers 210, 215 and antenna(s) 205. The modem(s) 220 may employ known modulation/demodulation, coding/decoding, and various other signal/communications processing techniques. In alternative embodiments, the modem(s) 220 may also have the ability to communicate over hard-wired networks using wired network transceiver 217. Such networks may include Ethernet for communicating over TCP/IP based networks.

The modem(s) 220 may be further coupled to the memory 230 which may store instructions in the form of software and/or firmware to configure the modem(s) to perform the functionality mentioned above. Moreover, in order to facilitate the enhanced call control functionality so it is transparent to the user, the modem(s) 220 of a terminal participating in the call may be further configured to perform enhanced call control, as will be discussed in more detail below.

The memory 230 may also be coupled to the processor(s) 270, which may utilize stored software and/or firmware to perform various processing functions, including the execution of the operating system and the applications residing on the mobile terminal 200. The processor(s) 270 may include one or more microprocessors, microcontrollers, and/or digital signal processors that provide processing functions, as well as other calculation and control functionality. As shown in FIG. 2, the memory 230 may external to the modem and the processor, and further can be shared between these two devices. For example, a section of the memory 230 may be devoted to processor memory 250, and a separate section of memory 230 may be devoted to modem memory 240. In alternative embodiments, the memories may be external and separate to the modem 220 and the processor(s) 270, and/or can be onboard the modem(s) 220 and/or the processor(s) 270 (e.g., within the same IC packages), or any combination thereof. The details of software/firmware functionality stored in processor memory 250 and modem memory 240 will be discussed in more detail below.

In processor memory 250, a number of software modules and data tables may be stored for use by processor 270 in order to manage and coordinate the overall operations of the mobile terminal 200. As illustrated in FIG. 2, processor memory 250 may include and/or otherwise receive application(s) 252, Application Programming Interfaces (APIs) 254, and an operating system 256. The application(s) 252 may be at least one process running on the processor 270 at the upper layer of the software architecture, such as the application level, and provide additional functionality to the mobile terminal 200. The application(s) 252 may include, for example, various VoIP applications to assist the mobile device 200 in transferring call traffic in the PS mode over IP network 135. The application(s) 252 may include, for example, programs such as Skype, Google Talk, and/or FaceTime. The processor memory 250 may further include APIs 254, which may be at a lower layer than the application(s) 252, to provide application(s) 252 structured access to functionality provided by the operating system 246. The operating system 256 is at a layer lower than the APIs 254, and thus can interact efficiently with various components of the hardware of the mobile terminal 200, such as the user interface hardware 275.

In modem memory 240, in addition to the signal/communication processing functionality described above, the modem 220 may utilize the call control module 242 and capability table 249 to perform enhanced call control. This functionality may be enabled within both the modem(s) 220 of both mobile terminals 105, 165 participating in the call. As will be described in more detail below, communications regarding the connections capability of each mobile terminal 105, 165 participating in the call may be exchanged between the modem(s) 220 of each mobile terminal 105, 165, and thus may not actively involve the processor(s) 270 and the upper layers of the mobile terminal, such as the operating system 256 or the application(s) 252. This approach may eliminate cumbersome manual selection in call setup while improving the reliability of communications during call setup. This approach also provides the flexibility to switch the CS call to a VoIP call or to incrementally upgrade content from baseline voice to multimedia. Lastly the mobile terminal 200 also can automatically establish associations between address book contacts and different VoIP IDs using the capability table. The capability table may include VoIP IDs such that the caller need only select the receiver in their address book to setup a VoIP call.

In more detail, the modem memory 240 may include a connection management module 244, a connection quality determination module 246, and connection capability determination module 248. The connection management module 244 may be used to establish, switch, and tear down connections which are associated with various connections. For example, the connection management module 244 may permit the mobile terminal 105 to establish a first connection to the destination mobile terminal 165 for communications over a first terminal link, such as air interface 115. Additionally, the connection management module 244 may establish a background connection to the destination mobile terminal 165 over an alternative terminal link such as air interface 125, based on the information provided by the connection capability determination module 248. The connection management module 244 may further switch the content path from the first connection over to the background connection. The connection quality determination module 246 may determine quality metrics of both the background connection and the first connection, so that the mobile terminal 200 may determine which connection is preferable for maintaining the content path. In one embodiment, the connection capability determination module 248 may receive information from the destination mobile terminal 165, over the initially established first connection, to establish a background connection using the air interface 125. The connection capability determination module 248 may work in conjunction with the capability table 249, which may also be stored in modem memory 240. The capability table 249 can be thought of as a directory for various services, and can associate various connection capabilities (e.g., what CS and PS connections) and/or associate identifications of users and their contacts among different communication services across different connections and call modes (e.g., associate phone numbers and VoIP IDs). This feature allows the mobile terminal 200 to automatically switch between appropriate connections, applications, communication services, and/or call modes, so that the user does not have to manually perform this operation.

One should appreciate that the organization of the memory 230 contents as shown in FIG. 2 is merely exemplary, and as such the functionality of the modules and/or data structures may be combined, separated, and/or be structured in different ways depending upon the implementation of the mobile terminal 200. Moreover, while the software modules shown in FIG. 2 are illustrated in the example as being contained in memory 230, it is recognized that in certain implementations such procedures may be provided for or otherwise operatively arranged using other or additional mechanisms. For example, all or part of call control module 242 may reside in firmware. Additionally, while in this example various modules in call control module 242 are illustrated as being separate features stored in memory, various procedures may alternatively be combined together with functionality performed in dedicated hardware.

Further referring to FIG. 2, the mobile terminal 200 may include a user interface 275 which provides any suitable interface systems, such as a microphone/speaker 280, keypad 285, and display or touchscreen 290 that allows user interaction with the mobile terminal 200. The microphone/speaker 280 provides for voice communication services using the wide area network associated with, for example, RF transceiver 1 210 and/or RF transceiver 2 215. The keypad 285 comprises any suitable buttons for user input, and may be optional when a touchscreen is present. The display 290 comprises any suitable display, such as, for example, a backlit LCD display, and can further include a touch screen display for additional user input modes.

As used herein, mobile terminal 200 may be any portable or movable device or machine that is configurable to acquire wireless signals transmitted from, and transmit wireless signals to, one or more wireless communication devices or networks. As shown in FIG. 2, the mobile terminal is representative of such a portable wireless device. Thus, by way of example but not limitation, mobile terminal 200 may include a radio device, a cellular telephone device, a computing device, a personal communication system (PCS) device, or other like movable wireless communication equipped device, appliance, or machine. Also, "mobile terminal" is intended to include all devices, including wireless communication devices, computers, laptops, etc. which are capable of communication with a server, such as via Ethernet, WiFi, or other network, and regardless of whether satellite signal reception, assistance data reception, and/or position-related processing occurs at the device, at a server, or at another device associated with the network. Any operable combination of the above are also considered a "mobile terminal." As used herein, the term "wireless device" may refer to any type of wireless communication device which may transfer information over a network. The wireless device may be any cellular mobile terminal, personal communication system (PCS) device, personal navigation device, laptop, personal digital assistant, or any other suitable mobile terminal capable performing the enhanced call control functionality.

Figure 3:
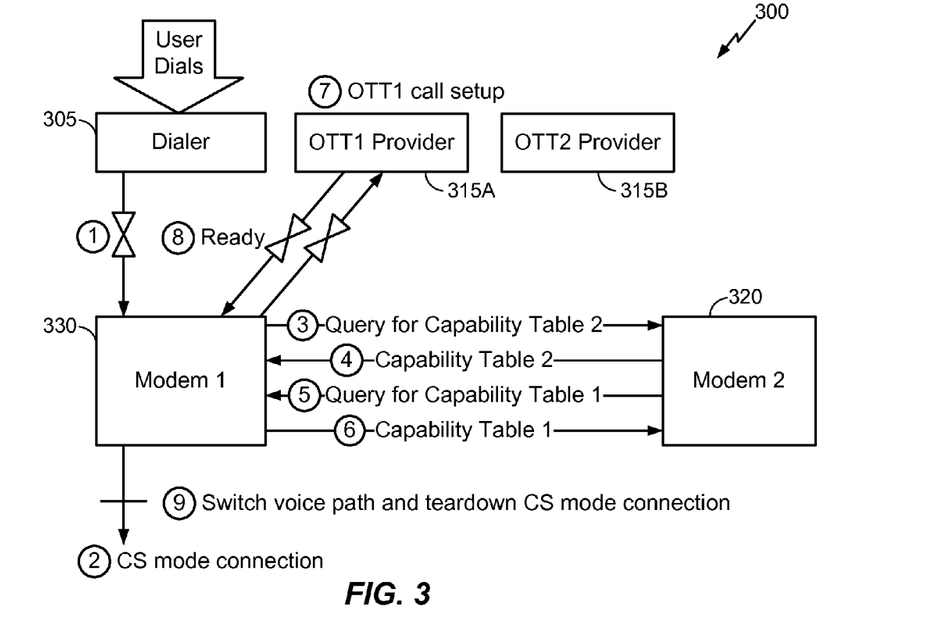
FIG. 3 is a block diagram for an embodiment of enhanced call control with mobile terminals using capability tables which are stored locally.

FIG. 3 is a block diagram 300 for an embodiment of enhanced call control with mobile terminals using capability tables which are stored locally. During call session, the following transactions may occur:

1. A user at the mobile terminal 105 may dial a phone number or select a Universal Resource Indicator (URI) to establish a first connection for placing a CS mode call. The dialer 305 communicates the destination information to the modem 1 330 inside mobile terminal 105.

2. Given the destination information, Modem 1 330 may establish a CS mode call over a first connection with the destination mobile terminal 165 to be used as a content path.

3. The enhanced call control framework in modem 1 330 may then query modem 2 320 on the mobile terminal 165 for its capability table to determine its capabilities. Such capabilities may include, for example, VoIP capability and ability to support concurrent CS mode and VoIP calls. The query may be made via in-band signaling in the first connection. Alternatively, if modem 1 330 has previously received modem 2's 320 capability table, the query made be made via out-of-band signaling over one of the connections and/or addresses listed in the previous capability table of modem 2 320.

4. In response to the request in 3, Modem 2 320 may provide its capability table to Modem 1 330.

5. Reciprocally, modem 2 320 may query modem 1 330 for its capability table via in-band or out-of-band signaling.

6. In response to the request in 5, Modem 1 330 may provide its capability table to Modem 2 320.

7. The enhanced call control process executing on modem 1 330 may choose and coordinate with a dialer specific to an over-the-top VoIP service provider 315A to set up a VoIP call (e.g., OTT call setup) with mobile terminal 165. The modem 1 330 may select from a number of VoIP service providers (315A, 315B, etc.).

8. Modem 1 330 may successfully establish a background connection which may be used for a concurrent VoIP call with the destination mobile terminal 165.

9. Following the establishment of the VoIP call with the mobile terminal 165, the content path may be switched from the first connection to the background connection, and in some embodiments, the first connection may be terminated. If first connection is not terminated, it may be kept active as a background connection.

Figure 4:
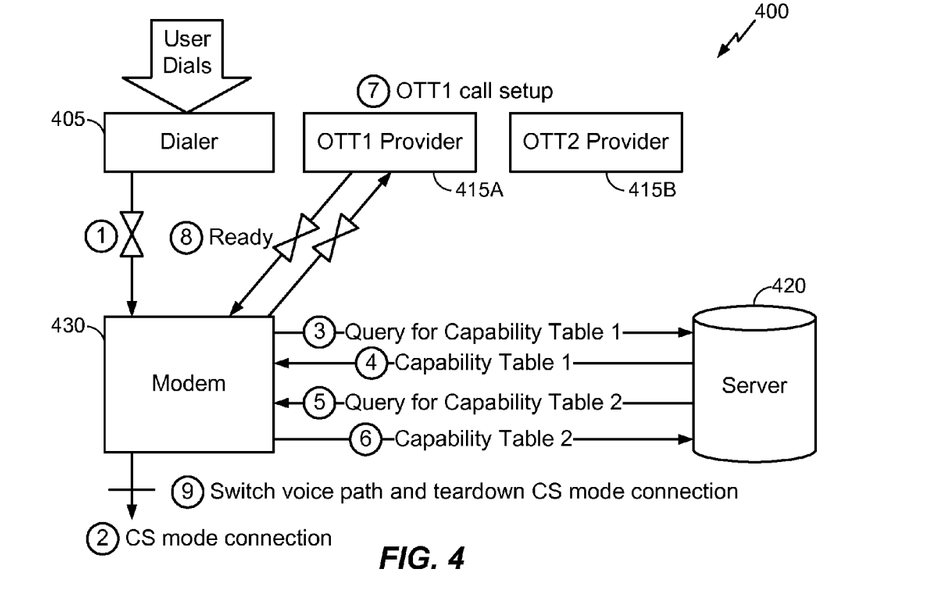
FIG. 4 is an exemplary block diagram for enhanced call control with a mobile terminal using a capability table which is stored on a remote server.

FIG. 4 is an exemplary block diagram 400 for enhanced call control with a mobile terminal using a capability table which is stored on a remote server 170. The call flow described above in FIG. 3 relies on a capability table managed on the modems of the mobile terminals to obtain the capability information. Alternatively, the capability information can be managed in a centralized directory service provided by a server sponsored by the carrier, enterprise, or a third party. Modems in all the mobile terminals may regularly send updates of their capability tables to the remote server 170. The corresponding structure is described below:

1. A user at the mobile terminal 105 may dial a phone number or select a Universal Resource Indicator (URI) to establish a first connection for placing a CS mode call. The dialer 405 communicates the destination information to the modem 430 inside mobile terminal 105.

2. Given the destination information, the modem 430 may establish a content path over a first connection with the destination mobile terminal 165.

3. The enhanced call control framework in the modem 430 may then query server 420 for capability table 1 for destination mobile terminal 165. Such capabilities may include, for example, VoIP capability and ability to support concurrent CS mode and VoIP calls.

4. The server 420 may respond to the query from modem 430 by providing the capability table 1 of the destination mobile terminal 165 to modem 430.

5. Reciprocally server 420 may query modem 430 for its capability table 2.

6. The modem 430 may respond to the query in 5 and provide the server 420 with its capability table 2.

7. The enhanced call control process may choose and coordinate with a dialer specific to an over-the-top VoIP service provider 415A to set up VoIP call with the destination mobile terminal 165. The modem 430 may select from a number of VoIP service providers (415A, 415B, etc.).

8. The modem 430 successfully establishes a connection which may be used for a concurrent VoIP call with the destination mobile terminal 165.

9. Following establishment of the VoIP call with the mobile terminal 165, the modem 430 may switch the content path from the first connection to the background connection, and in some embodiments, the first connection may be torn down. If the first connection is not terminated, it may be kept active as a background connection.

Furthermore, enhanced call control may use split strategy where a voice path can be setup using either CS mode call control or PS mode (e.g., VoIP) call control. Selection between CS mode call control and PS mode call control may be determined by various criteria such as reliability, cost, preference, etc. For example, to improve the reliability of a successful call setup, call control can first select CS mode to establish the call. Later, as needed, the call can be switched to be a PS VoIP call. Alternatively, the call flow may always start with trying to establish a PS VoIP call first and upon failure to establish a connection or lack of a corresponding VoIP ID in the capability table, the mobile terminal 105 may setup a CS mode call. Once the CS mode call is set, then in-band signaling, SMS, MMS, etc. may be used to exchange capability tables between mobile terminal 105 and mobile terminal 165. Going forward mobile terminal 105 and mobile terminal 165 may choose to use the available PS VoIP paths. Alternatively, the call flow may always start with trying to establish a CS voice call and a PS VoIP call simultaneously. The Call Control Module 240 can choose among the successful connections which one to keep as the first connection and which to treat as background connections (which it may choose to tear down).

Figure 5:
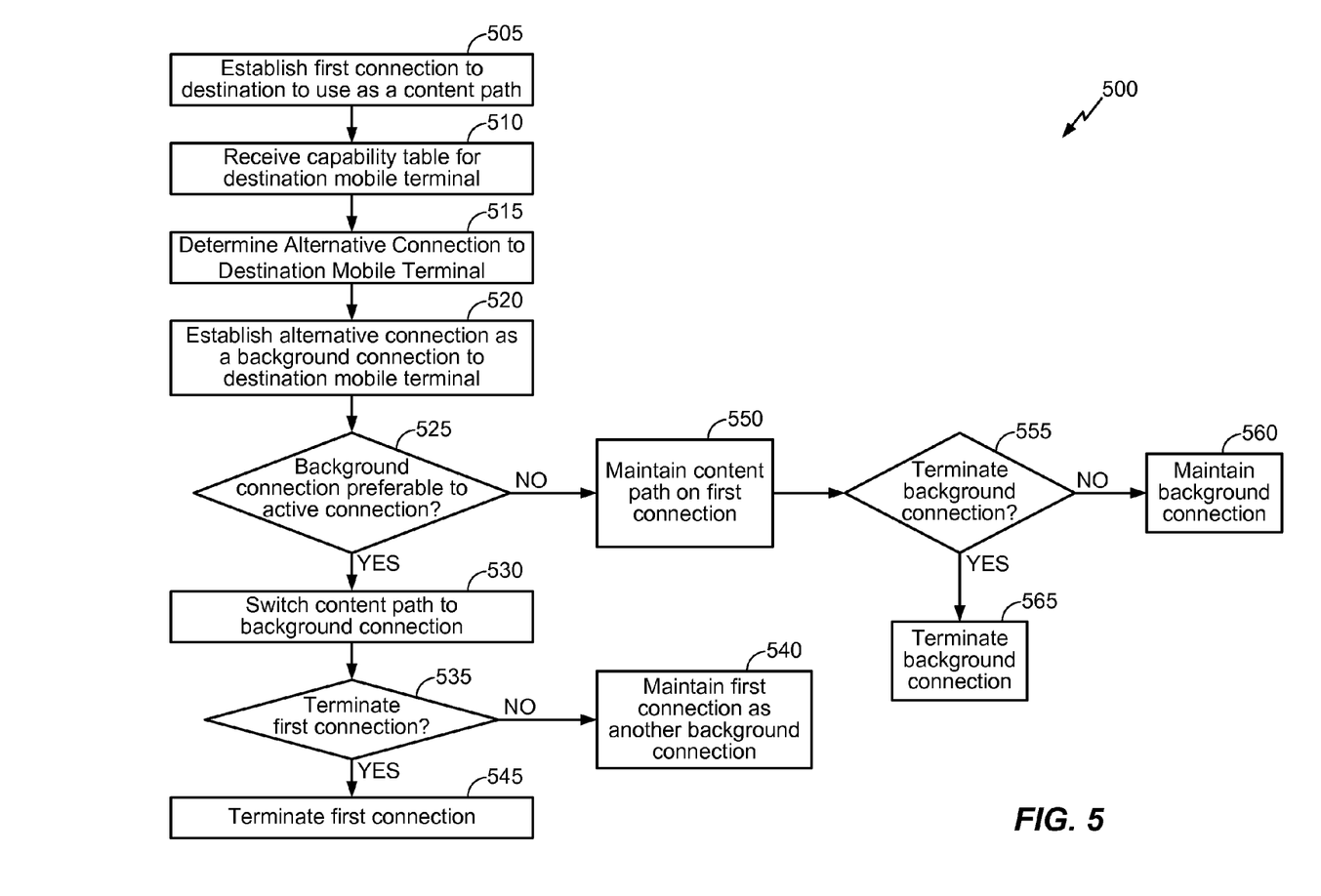
FIG. 5 depicts a flow chart which describes an embodiment of the enhanced call control process.

FIG. 5 depicts a flow chart which describes an embodiment of the enhanced call control process 500. The call control process may be performed by the modem(s) 220/330 in the mobile terminal 105. The process may start out by having the mobile terminal 105 establish a first connection to a destination mobile terminal 165 to use as a content path (Block 505). The mobile terminal 105 may then receive a capability table for the destination mobile terminal 165 (Block 510). The mobile terminal 105 may then determine an alternative connection to the destination mobile terminal 165 based on the capability information received (Block 515). The mobile terminal 105 may then establish the alternative connection as a background connection to the destination mobile terminal 165 (Block 520). For an alternative embodiment in Block 505 through Block 520, the mobile terminal 105 may start out by establishing a first connection and a background connection simultaneously to the destination mobile terminal to simultaneously exchanging call traffic representing the same content. In this embodiment, the connection used as the content path may be designated as the first connection, and the other connection designated as the background connection.

In Block 525, the mobile terminal 105 may evaluate the background connection and determine whether it is preferable to the first connection established in Block 505. The evaluating may be based, for example, on whether the background connection, which may be operating in a PS (VoIP) call mode, is becoming unreliable on either side of a call due to, for example, air interface issues on either side of the background connection (e.g., WiFi radio connection failing), or backhaul issues (e.g. a WiFi router or a backhaul connection on either end getting too much traffic), or core network issues (e.g. VoIP service core network on either end getting too much traffic). The evaluation in Block 525 may be accomplished by characterizing the performance of the background connection based on known metric(s) (e.g., signal-to-interference plus noise ratio, data error rates, etc.), and then, for example, determining whether the performance meets a predetermined threshold associated with the metric(s).

If the background connection is not preferable to the first connection, then the content path may be maintained on the first connection (Block 550). Another determination may be made whether to terminate the background connection (Block 555). If the determination in Block 555 is affirmative, the background connection will be terminated (Block 565). Otherwise, the background connection will be maintained (Block 560).

Alternatively, if it is determined in Block 525 that the background connection is preferable to the first connection, then the content path may be switched to the background connection (Block 530). A determination may then be made as to whether the first connection should be terminated (Block 535). If so, the first connection is terminated (Block 545). Otherwise, the first connection may be maintained as another background connection (Block 540).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, the invention is not limited to illustrated examples and any means for performing the functionality described herein are included in embodiments of the invention. While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for controlling a content path over multiple connections, comprising:
    establishing a first connection to a destination to use as a content path;
    receiving capability information from the destination for establishing an alternative connection, wherein the capability information includes a capability table which associates user contact information among different services associated with the destination and includes rules for selecting a service for the alternative connection;
    establishing as the alternative connection a background connection to the destination based on the information received;
    evaluating whether the background connection is preferable to the first connection for use as the content path by characterizing and comparing a performance of the background connection with a performance of the first connection; and
    switching the content path to the background connection when the background connection is preferable.

2. The method of claim 1, further comprising:
    terminating the first connection after the content path is switched to the background connection.

3. The method of claim 1, wherein the first connection further comprises a first air interface or a wired interface, and further wherein the background connection further comprises a second air interface or a second wired interface.

4. The method of claim 3, wherein an air interface may comprise a wireless wide area network and/or a wireless local area network.

5. The method of claim 1, wherein the first connection utilizes a first call mode, and the background connection utilizes a second call mode.

6. The method of claim 1, wherein switching the content path further comprises switching an application and/or a service for providing content.

7. The method of claim 1, wherein the content path may exchange call traffic which comprises at least one of voice data, video data, image data, text data, audio data, animation data, or any combination thereof.

8. The method of claim 7, wherein the call traffic exchanged over the first connection and the call traffic exchanged over the background connection represents the same content.

9. The method of claim 8, wherein the call traffic exchanged over the first connection and the call traffic exchanged over the background connection is exchanged substantially at the same time.

10. The method of claim 1, wherein the capability table associates a contact's cellular phone number with the contact's VoIP user identification.

11. The method of claim 1, wherein the capability table is stored remotely on a mobile terminal at the destination.

12. The method of claim 1, wherein the evaluating whether the background connection is preferable to the first connection for use as the content path further comprises:
  determining that the performance of the background connection meets a predetermined threshold.

13. The method of claim 12, wherein the predetermined threshold is stored in the capability table.

14. A mobile terminal which controls a content path over multiple connections, comprising:
  at least one transceiver;
  a modem coupled to the at least one transceiver; and
  a memory coupled to the modem, wherein the memory stores executable instructions and data for causing the modem to
    establish a first connection to a destination to use as a content path,
    receive capability information from the destination for establishing an alternative connection, wherein the capability information includes a capability table which associates user contact information among different services associated with the destination and includes rules for selecting a service for the alternative connection,
    establish as the alternative connection a background connection to the destination based on the information received,
    evaluate whether the background connection is preferable to the first connection for use as the content path by characterizing and comparing a performance of the background connection with a performance of the first connection, and
    switch the content path to the background connection when the background connection is preferable.

15. The mobile terminal of claim 14, wherein the instructions further cause the modem to:
  terminate the first connection after the content path is switched to the background connection.

16. The mobile terminal of claim 14, wherein the first connection further comprises a first air interface or a wired interface, and further wherein the background connection further comprises a second air interface or a second wired interface.

17. The mobile terminal of claim 16, wherein an air interface may comprise a wireless wide area network and/or a wireless local area network.

18. The mobile terminal of claim 14, wherein the first connection utilizes a first call mode, and the background connection utilizes a second call mode.

19. The mobile terminal of claim 14, wherein the instructions further cause the modem to switch an application and/or a service for providing content.

20. The mobile terminal of claim 14, wherein the content path may exchange call traffic which comprises at least one of voice data, video data, image data, text data, audio data, animation data, or any combination thereof.

21. The mobile terminal of claim 20, wherein the call traffic exchanged over the first connection and the call traffic exchanged over the background connection represents the same content.

22. The mobile terminal of claim 21, wherein the call traffic exchanged over the first connection and the call traffic exchanged over the background connection is exchanged substantially at the same time.

23. The mobile terminal of claim 14, wherein the capability table associates a contact's cellular phone number with the contact's VoIP user identification.

24. The mobile terminal of claim 14, wherein the capability table is stored remotely on a mobile terminal at the destination.

25. The mobile terminal of claim 14, wherein the instructions to evaluate whether the background connection is preferable to the first connection for use as the content path comprise instructions which cause the modem to:
  determine that the performance of the background connection meets a predetermined threshold.

26. The mobile terminal of claim 25, wherein the predetermined threshold is stored in the capability table.

27. An apparatus for controlling a content path over multiple connections, comprising:
  means for establishing a first connection to a destination to use as a content path;
  means for receiving capability information from the destination for establishing an alternative connection, wherein the capability information includes a capability table which associates user contact information among different services associated with the destination and includes rules for selecting a service for the alternative connection;
  means for establishing as the alternative connection a background connection to the destination based on the information received;
  means for evaluating whether the background connection is preferable to the first connection for use as the content path by characterizing and comparing a performance of the background connection with a performance of the first connection; and
  means for switching the content path to the background connection when the background connection is preferable.

28. The apparatus of claim 27, further comprising:
  means for terminating the first connection after the content path is switched to the background connection.

29. A non-transitory computer-readable medium having stored thereon modem-executable instructions configured to cause a modem to perform operations comprising:
  establishing a first connection to a destination to use as a content path;
  receiving capability information from the destination for establishing an alternative connection, wherein the capability information includes a capability table which associates user contact information among different services associated with the destination and includes rules for selecting a service for the alternative connection;
  establishing as the alternative connection a background connection to the destination based on the information received;
  evaluating whether the background connection is preferable to the first connection for use as the content path by characterizing and comparing a performance of the background connection with a performance of the first connection; and switching the content path to the background connection when the background connection is preferable.

\* \* \* \* \*